United States Patent [19]

Meister

[11] Patent Number: 5,321,389
[45] Date of Patent: Jun. 14, 1994

[54] BATTERY CHARGE MONITOR

[75] Inventor: Jack B. Meister, Convent Station, N.J.

[73] Assignee: Echlin, Incorporated, Branford, Conn.

[21] Appl. No.: 982,707

[22] Filed: Nov. 27, 1992

[51] Int. Cl.$^5$ .................................................. B60Q 1/00
[52] U.S. Cl. .................................... 340/455; 340/636; 340/663; 307/10.7; 361/92; 335/177
[58] Field of Search ................. 340/636, 455, 663; 320/13, 38, 40, 48; 307/10.7; 362/92; 290/38 R; 335/177, 178, 179

[56] References Cited

U.S. PATENT DOCUMENTS

| | | | |
|---|---|---|---|
| 3,395,288 | 7/1968 | Von Brimer. | |
| 3,646,354 | 2/1972 | Von Brimer. | |
| 3,852,732 | 12/1974 | Yorksie et al. | |
| 4,039,903 | 8/1977 | Russell | 361/187 |
| 4,127,782 | 11/1978 | Omura et al. | |
| 4,149,093 | 4/1979 | D'Alessio et al. | |
| 4,493,001 | 1/1985 | Sheldrake. | |
| 4,902,956 | 2/1990 | Sloan. | |
| 5,089,762 | 2/1992 | Sloan | 320/13 |
| 5,136,230 | 8/1992 | Gayler | 320/13 |
| 5,140,250 | 8/1992 | Morland | 320/13 |
| 5,159,257 | 10/1992 | Oka et al. | 320/13 |
| 5,170,151 | 12/1992 | Hochstein | 340/636 |
| 5,200,877 | 4/1993 | Betton et al. | 361/92 |

Primary Examiner—John K. Peng
Assistant Examiner—Nina Tong
Attorney, Agent, or Firm—Barnes, Kisselle, Raisch, Choate, Whittemore & Hulbert

[57] ABSTRACT

A battery charge monitor for automotive vehicles that includes electronic circuitry for connection to the vehicle battery and responsive to battery voltage to provide a first electrical signal when battery voltage decreases to a selected threshold level. A latching relay includes relay contacts for connection between the vehicle battery and vehicle battery loads, including the starter. A first relay coil is operatively coupled to the relay contacts and responsive to the first signal from the electronic circuitry to open the relay contacts and disconnect the battery from the battery loads including the starter. A second relay coil is operatively coupled to the relay contacts and responsive to a second electrical signal from an operator reset switch for reclosing the relay contacts and connecting the battery to the loads. Thus, when battery charge reaches a level below which starting may be difficult, the electronic circuitry cooperates with the latching relay to disconnect the battery from the loads. When the vehicle is to be started, the battery is reconnected to the loads, including the starter, by operation of the reset switch before energizing the starter.

12 Claims, 3 Drawing Sheets

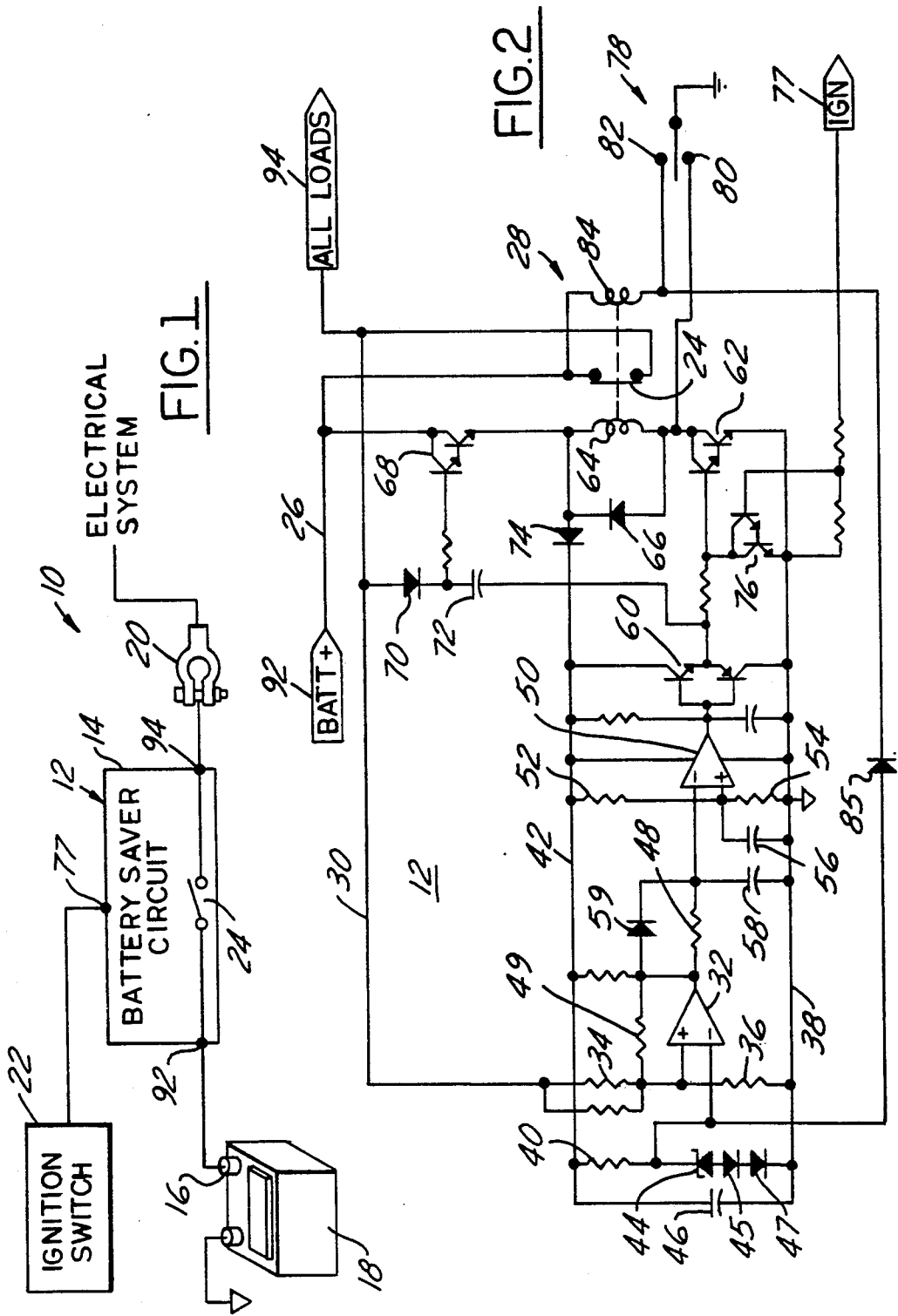

BATTERY CHARGE MONITOR

The present invention relates to vehicle electrical systems, and more particularly to a device for monitoring battery charge level and disconnecting the battery when charge reaches a level that could prevent starting of the vehicle engine.

BACKGROUND AND SUMMARY OF THE INVENTION

In conventional automotive vehicles, the electrical system includes loads, such as the clock, radio station programming and engine control computer, that draw current from the battery when the vehicle is not in use. When the vehicle is not used for long periods, these and other components may discharge the battery to a level at which the battery can no longer supply sufficient energy to start the engine. There is also the recognized potential of discharging the battery by inadvertently leaving the vehicle headlights or cabin lights turned on.

A general object of the present invention is to provide a device for monitoring battery charge level, and automatically disconnecting the battery from vehicle loads when battery charge reaches a level below which the battery may not be able to supply sufficient energy to start the vehicle. Another object of the present invention to provide a monitor device of the described character that is inexpensive to manufacture, that is reliable over an extended useful life, that can be built into a vehicle at the time of manufacture or added to a vehicle as an aftermarket accessory, and that includes facility for operator disconnection of the vehicle battery independent of the monitor when the vehicle will not be used for a long period of time. Another and related object of the invention is to provide a battery monitor of the described character in which the battery charge threshold level may be varied for differing conditions, such as summer and winter starting conditions. A further object of the invention is to provide a battery switch system for use in vehicles such as trucks in which the battery is to be disconnected from the loads when the vehicle is not in use independent of battery charge level.

A battery charge monitor for automotive vehicles in accordance with the present invention includes electronic circuitry for connection to the vehicle battery and responsive to battery voltage to provide a first electrical signal when battery voltage decreases to a selected threshold level. A latching relay includes relay contacts for connection between the vehicle battery and vehicle battery loads, including the starter. A first relay coil is operatively coupled to the relay contacts and responsive to the first signal from the electronic circuitry to open the relay contacts and disconnect the battery from the battery loads, including the starter. A second relay coil is operatively coupled to the relay contacts and responsive to a second electrical signal from an operator reset switch for reclosing the relay contacts and connecting the battery to the loads. Thus, when battery charge reaches a level below which starting may be difficult, the electronic circuitry cooperates with the latching relay to disconnect the battery from the loads. When the vehicle is to be started, the battery is reconnected to the loads, including the starter, by operation of the reset switch before energizing the starter.

The latching relay holds the relay contacts in a first position closing the contacts in the absence of the first electrical signal from the electronic circuitry, and holds the contacts in a second position opening the contacts in the absence of the reset signal from the manual switch. The relay contacts include a fixed contact and a movable contact carried by a resilient contact arm that normally biases the movable contact against the fixed contact. The first relay coil includes a plunger that urges the arm and movable contact away from the fixed contact until a detent protrusion on the arm rides over a fixed ledge, at which point resiliency of the contact arm latches the protrusion over the ledge and holds the contacts out of engagement. The second relay coil includes a plunger that engages the contact arm adjacent to the detent for pushing the protrusion off of the ledge, such that resiliency of the contact arm urges the contacts into re-engagement.

A second manual switch is responsive to the operator for providing the first signal to energize the first relay coil independent of the electronic circuitry, so that an operator may manually disconnect the battery from the battery loads independent of the electronic circuitry when the vehicle is going to be stored, for example. In the preferred embodiment of the invention, the first and second manual switches comprise a single toggle switch having a center-open position. Preferably, disconnection of the battery is inhibited when vehicle ignition is turned on so that the vehicle battery will not be inadvertently disconnected during operation. The monitor circuitry includes a delay to isolate the disconnection relay from transient changes in battery voltage. Preferably, the battery disconnection threshold can be varied for differing operating conditions, such as ambient temperature.

BRIEF DESCRIPTION OF THE DRAWINGS

The invention, together with additional objects, features and advantages thereof, will be best understood from the following description, the appended claims and the accompanying drawings in which:

FIG. 1 is a functional block diagram of a vehicle electrical system with a battery monitor in accordance with an aftermarket embodiment of the present invention;

FIG. 2 is an electrical schematic diagram of the battery saver circuit in FIG. 1 in accordance with a presently preferred embodiment of the invention;

DETAILED DESCRIPTION OF PREFERRED EMBODIMENT

Figure 3:
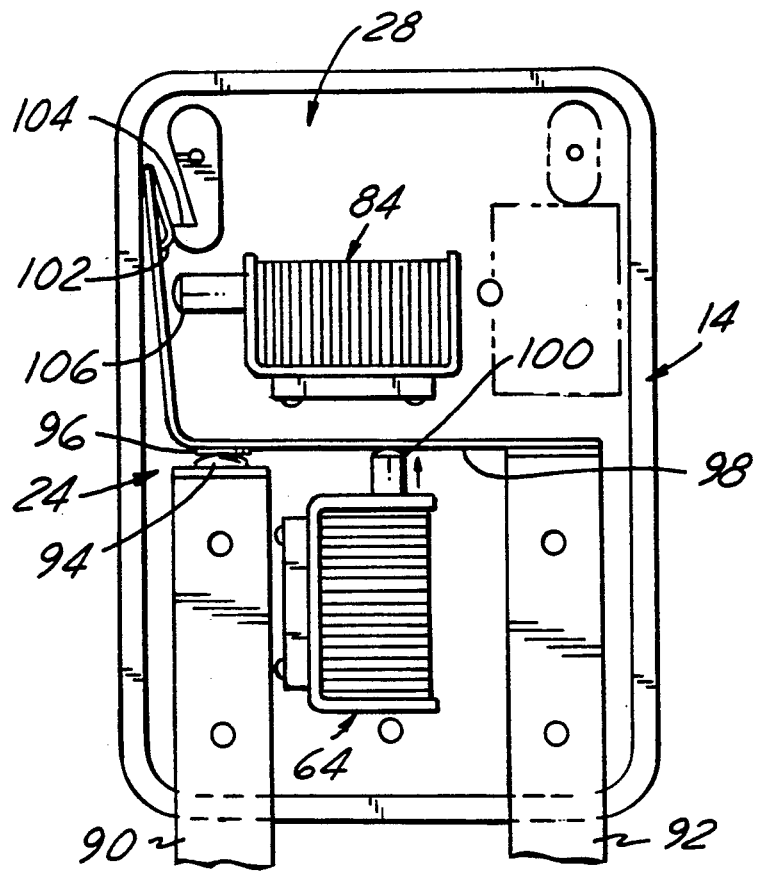
FIGS. 3 and 4 are elevational views of the battery monitor latching relay in the closed and open positions respectively.

FIG. 1 illustrates a vehicle electrical system 10 that includes a battery saver or monitor circuit 12 in accordance with the present invention. Circuit 12 is contained within a housing 14 (FIGS. 3 and 4) that mounts over the post 16 of the vehicle battery 18, and includes a post for receiving the terminal connector 20 that connects to the vehicle electrical system. Thus, in the preferred aftermarket implementation of the invention, battery saver circuit 12 includes a switch 24 that serves to isolate vehicle battery 18 from all electrical loads, including the starter. The operator ignition switch 22 is connected to circuit 12 for inhibiting operation of switch 24 and disconnection of battery 18 during normal vehicle operation.

FIG. 2 is an electrical schematic diagram of circuit 12. Battery voltage is supplied by a terminal 92 (FIGS. 1–4) to a battery voltage bus 26. Bus 26 is connected through the switch contacts 24 of a latching relay assembly 28 to the battery loads through a terminal 94 (FIGS. 1–4). A switched battery power bus 30 is also connected to the load side of relay switch contacts 24. A comparator 32 has a non-inverting input connected to a resistive voltage divider 34,36 between bus 30 and a ground bus 38. The inverting input of comparator 32 is connected through a resistor 40 to a bus 42 whose voltage level is regulated by a zener diode 44 and a pair of temperature sensitive diodes 45,47. A capacitor 46 is connected between bus 42 and ground 38 to stabilize the regulated voltage level. The output of comparator 32 is connected through a resistor 48 to the inverting input of a second comparator 50. A resistor 49 is connected between the output of comparator 32 and its non-inverting input, and a diode 59 is connected across resistor 59. The non-inverting input of comparator 50 is connected to a voltage divider 52,54 across bus 42, with a stabilizing capacitor 56 being connected across resistor 54. A capacitor 58 is connected between the inverting input of comparator 50 and ground bus 38.

The output of comparator 50 is connected through a transistor amplifier 60 to the control terminal of a relay coil drive transistor switch 62. Switch 62 is connected in series with a first coil 64 of latching relay 28 between regulated voltage bus 42 and ground bus 38. A diode 66 is connected across coil 64 to prevent ringing in the coil. A transistor switch 68 is connected between battery voltage bus 26 and coil 64, and has a control terminal connected through a diode 70 to bus 30. The control terminal of switch 68 is also connected through a capacitor 72 to the output of amplifier 60. Power to regulated battery voltage bus 42 is supplied from switch 68 through a diode 74. A transistor switch 76 receives a control input signal from the vehicle ignition switch 22 (FIG. 1) through terminal 77 on housing 14 (FIGS. 1&2), and has an output connected between the control input to switch 62 and ground bus 38. A two-position center-off toggle switch 78 has its common contact connected to ground, has one contact 80 connected to first relay coil 64 in parallel with transistor switch 62, and has its second contact 82 connected in series with a second relay coil 84 of latching relay 28. A diode 58 is connected between coil 84 and the inverting input of comparator 32.

In operation, when battery voltage is at normal operating level and relay switch 24 is in the position illustrated in FIG. 2 (and FIG. 3), battery voltage is applied to the vehicle electrical system battery loads, and through switch 68 to bus 42. Battery voltage at bus 30 is compared at comparator 32 with a reference determined by the regulated battery voltage level. When battery voltage decreases below the threshold determined by resistors 34,36 and zener diode 44, the output of comparator 32 switches from a high voltage state or level to a low voltage state or level. Resistor 49 prevents cyclic operation of comparator 32 when battery voltage hovers around this threshold level. Temperature sensitive diodes 45,47 are effective to vary the reference voltage as a function of temperature. These automatically adjust the battery cut-out threshold level based on temperature so that more battery energy will be saved for the more difficult cold weather starting in winter.

When the output of comparator 32 switches to a low voltage level, the charge stored on capacitor 58 through diode 59 discharges through resistor 48 over a time period determined by the component values of resistor 48 and capacitor 58. This resistor and capacitor combination thus forms a delay circuit to isolate the remainder of the circuitry and latching relay 28 from transient changes in battery voltage level, such as during cranking of the engine. This time delay may be on the order of twenty seconds. After this delay period, the output of comparator 50 switches to a high voltage level, and functions through switch 60 to close relay drive switch 62. At the same time, capacitor 72 functions to boost current applied to relay coil 64 through switch 68, so as to energize relay coil 64 and open switch contacts 24. The vehicle battery is thereby disconnected from all battery loads, including battery monitor circuitry 12 after capacitor 72 times out.

When it is desired to start the engine, the operator activates switch 78 to ground terminal 82 and thereby energized relay coil 84 to close and latch relay contacts 24. Power is thereby reapplied to the electrical battery loads, including the starter. At the same time, the inverting input of comparator 32 is grounded through diode 85, charging capacitor 58 through diode 59. A low battery level will therefore not reactivate relay coil 64 for twenty seconds. The operator may then start the engine in the normal manner using the ignition switch. When the ignition switch is moved to the "on" position, transistor switch 76 inhibits operation of transistor switch 62, isolating switch 62 and relay coil 64 from the remainder of circuitry 12, which may detect a low battery voltage condition during cranking. In the meantime, when relay contacts 24 are closed, capacitor 58 is rapidly charged from bus 42 through diode 59. Switch 78 preferably is located within the vehicle cabin on or beneath the dashboard, or in the glove compartment. Switch 78 may be moved by an operator to ground contact 80 when the vehicle will be placed in storage, for example, so as to activate relay coil 64 and open relay contacts 24 independent of the remainder of the electronic circuitry 12, and disconnect the battery from all loads.

Figure 4:
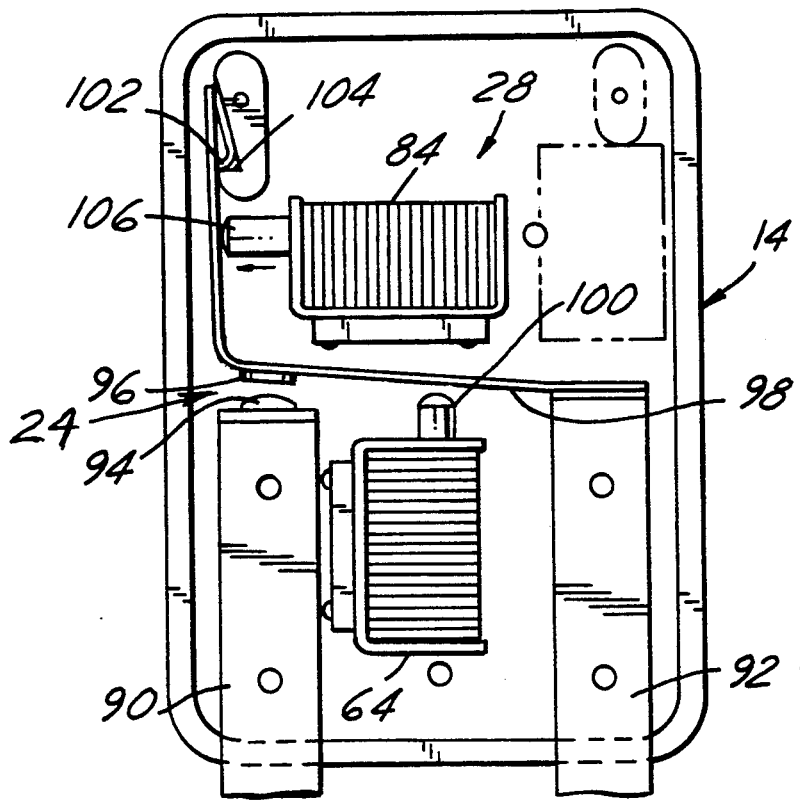

FIGS. 3 and 4 illustrate latching relay 28 within generally rectangular molded plastic enclosure or housing 14. The pair of terminals 90,92 extend from housing 14 for connection to the vehicle battery and loads respectively. Relay switch contact switch 24 include a first contact terminal 94 carried in fixed position on terminal 90, and a second contact terminal 96 carried by a resilient arm 98 affixed at one end to terminal 92. Resiliency of arm 98 normally urges contacts 94,96 into mechanical and electrical engagement as shown in FIG. 3 so as to close relay contact switch 24. Relay coil 64 is mounted within housing 14 between terminals 90,92, and has a plunger 100 positioned to engage arm 98 and urge arm 98 away from fixed contact 94. A ledge 104 is molded or affixed to housing 14 adjacent to the free end of arm 98, and resiliency of the arm urges a protrusion 102 on the arm free end toward ledge 104. Coil 84 is mounted on housing 14 adjacent to ledge 104, and has a plunger 106 for pushing the arm away from the ledge.

Thus, when coil 64 is energized either by relay drive switch 62 (FIG. 2) or manual switch 78, plunger 100 of relay coil 64 moves in the direction of the arrow in FIG. 3, moving contact 96 away from contact 94 and bringing curved protrusion 102 on arm 98 over detent ledge 104. The detent formed by protrusion 102 and ledge 104 cooperate with resiliency of arm 98 to hold arm 98 and contact 96 out of engagement with contact 94, as shown in FIG. 4. Plunger 106 of relay coil 84 engages arm 98 adjacent to detent 102,104 so as to urge protrusion 102 off of ledge 104 in the direction shown by the arrow in FIG. 4 when relay coil 84 is energized by switch 78 (FIG. 2), after which resiliency of arm 98 brings contacts 96,94 into reengagement (FIG. 3). Thus, energization of relay coil 84 by switch 78 (FIG. 2) resets relay contacts 24 to the normally closed position illustrated in FIGS. 2 and 3.

Figure 5:
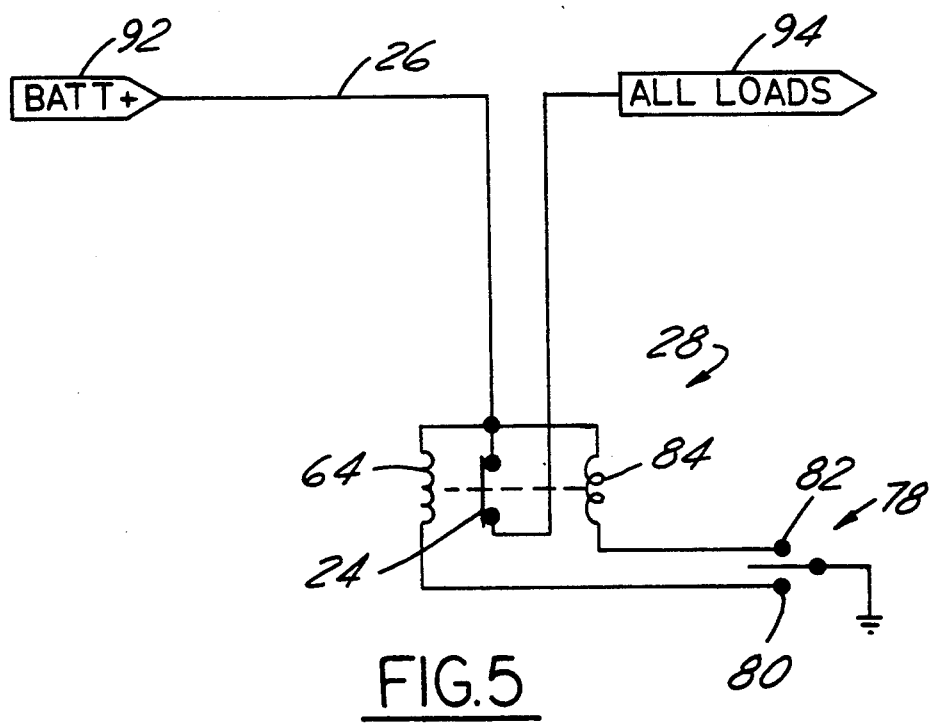
FIG. 5 is a schematic diagram of a modified embodiment of the invention.

A modified embodiment of the invention is illustrated in FIG. 5, in which reference numerals identical to those employed in FIGS. 1-4 indicate identical components. In FIG. 5, switch contacts 80,82 are connected to coils 64,84 of latching relay 28 as in FIG. 2, but this time constitute the sole means of energizing the coils. Thus, when switch contact 80 is grounded, relay switch 24 is opened, and when switch contact 82 is grounded, relay switch 24 is closed. The embodiment of FIG. 5 is particularly useful where the battery is to be disconnected regardless of charge, such as in large trucks, for service or when the vehicle will not be used for a long period.

I claim:

1. A battery charge monitor for automotive vehicles having a vehicle battery, a starter and an ignition, said monitor comprising:
   electronic circuit means for connection to the vehicle battery and responsive to the battery voltage to provide a first electrical signal when said battery voltage decreases to a selected threshold level,
   latching relay means including relay contact means for connection between the vehicle battery and vehicle battery loads including the starter, first relay coil means operatively coupled to said relay contact means and responsive to said first signal to open said relay contact means and disconnect the battery from the battery loads, and second relay coil means operatively coupled to said relay contact means and responsive to a second electrical signal for closing said relay contact means and connecting the battery to the loads,
   said latching relay means including first means for holding said relay contact means in a first position closing said relay contact means in the absence of said first signal, and second means for holding said relay contact means in a second position opening said relay contact means in the absence of said second signal and
   first switch means responsive to an operator to provide said second electrical signal to said second relay coil means.

2. The monitor set forth in claim 1 wherein said relay contact means includes a fixed contact and a movable contact carried by a resilient contact arm, said first means comprising resiliency of said arm urging said movable contact against said fixed contact, said second means comprising detent means on said arm, said first coil means moving said arm to separate said contacts and engage said detent means to hold said arm and said movable contact spaced from said fixed contact, said second coil means moving said arm to disengage said detent means such that resiliency of said arm closes said movable contact against said fixed contact.

3. The monitor set forth in claim 2 wherein said detent means comprises a fixed ledge and a protrusion on said arm, resiliency of said arm urging said protrusion toward said ledge.

4. The monitor set forth in claim 1 further comprising second switch means responsive to an operator for providing said first signal to said first relay coil means independent of said electronic circuit means.

5. The monitor set forth in claim 4 wherein said first and second switch means comprise a single center-open toggle switch.

6. The monitor set forth in claim 1 wherein said electronic circuit means further includes means responsive to the vehicle ignition for inhibiting provision of said first signal independent of battery voltage.

7. The monitor set forth in claim 6 wherein said electronic circuit means further includes means for delaying application of said first signal to said first relay coil means so as to isolate said first relay coil means from transient changes in battery voltage.

8. The monitor set forth in claim 1 wherein said electronic circuit means including means for varying said selected threshold.

9. The apparatus set forth in claim 8 wherein said threshold-varying means comprises means for automatically varying said threshold as a function of temperature.

10. A latching relay that includes,
    a pair of terminals for connection to an external circuitry, a pair of contacts, one of said contacts being operatively coupled to one of said terminals,
    a resilient contact arm operatively coupling the other of said contacts to the other of said terminals, resiliency of said arm urging said other contact toward a first predetermined position with respect to said one contact,
    detent means on said arm for holding said arm in a second predetermined position with respect to said one contact, one of said predetermined positions being with said contacts in electrical engagement and the other of said predetermined positions being with said contacts spaced from each other, and
    a pair of solenoid coils having plungers for operative engagement with said arm, each of said solenoid coils being responsive to an electrical signal for moving the associated plunger and said arm to said first and second positions respectively.

11. A battery switch system for automotive vehicles having a vehicle battery comprising:
    latching relay means including relay contact means for connection between the vehicle battery and vehicle battery loads including the starter, first relay coil means operatively coupled to said relay contact means and responsive to a first electrical signal to open said relay contact means and disconnect the battery from the battery loads, and second relay coil means operatively coupled to said relay contact means and responsive to a second electrical signal for closing said relay contact means and connecting the battery to the loads, and
    switch means responsive to an operator to provide said first electrical signal to disconnect the battery and said second electrical signal to reconnect the battery.

12. The system set forth in claim 11 wherein said switch means comprises a single center-open toggle switch.

* * * * *